United States Patent
Halim et al.

(10) Patent No.: US 10,430,289 B2
(45) Date of Patent: Oct. 1, 2019

(54) ONLINE-ASSISTED BACKUP AND RESTORE

(75) Inventors: Chris Halim, San Jose, CA (US); Hong Quang Bui, Capo Beach, CA (US)

(73) Assignee: UNICOM SYSTEMS, INC., Mission Hills, CA (US)

( * ) Notice: Subject to any disclaimer, the term of this patent is extended or adjusted under 35 U.S.C. 154(b) by 0 days.

(21) Appl. No.: 12/417,419

(22) Filed: Apr. 2, 2009

(65) Prior Publication Data

US 2009/0254593 A1   Oct. 8, 2009

Related U.S. Application Data

(60) Provisional application No. 61/042,197, filed on Apr. 3, 2008.

(51) Int. Cl.
*G06F 11/14* (2006.01)
*G06F 16/178* (2019.01)

(52) U.S. Cl.
CPC ...... *G06F 11/1461* (2013.01); *G06F 11/1464* (2013.01); *G06F 16/178* (2019.01)

(58) Field of Classification Search
CPC ........... G06F 17/30073; G06F 11/1458; G06F 11/1461; G06F 11/1464; G06F 16/178
USPC ................................. 707/654, 653
See application file for complete search history.

(56) References Cited

U.S. PATENT DOCUMENTS

| | | | |
|---|---|---|---|
| 6,266,784 B1 * | 7/2001 | Hsiao et al. | 714/6.3 |
| 7,100,007 B2 * | 8/2006 | Saika | 711/162 |
| 7,315,959 B2 | 1/2008 | Wu | |
| 7,624,134 B2 * | 11/2009 | Stakutis et al. | 707/999.204 |
| 7,734,594 B2 * | 6/2010 | Wang | 707/644 |
| 7,818,160 B2 * | 10/2010 | Collins et al. | 703/24 |
| 2002/0069268 A1 | 6/2002 | Chang | |
| 2003/0023673 A1 | 1/2003 | Tso | |
| 2004/0133545 A1 | 7/2004 | Kiessig et al. | |
| 2005/0091247 A1 | 4/2005 | Berkowitz et al. | |
| 2005/0144528 A1 * | 6/2005 | Bucher et al. | 714/38 |

(Continued)

OTHER PUBLICATIONS

Memeo AutoBackup version 2 User Guide, Doc version: mab083106, snapshot taken Feb. 26, 2007, available on the Internet Archive Wayback Machine at http://web.archive.org/web/20070226111849/www.memeo.com/autobackup_user_guide.htm, pp. 1-31.*

(Continued)

*Primary Examiner* — Scott A. Waldron
(74) *Attorney, Agent, or Firm* — IPR Law Group PC

(57) ABSTRACT

A system includes a server and a source client executable on a first electronic device configured to be in communication over a network with the server. The first electronic device has stored thereon a plurality of electronic files. The first electronic device is in communication with at least one storage device of a plurality of storage devices. The source client is configured to generate a first electronic-file backup plan. The first backup plan characterizes a first set of the storage devices. The first backup plan further designates, according to input received from a user of the source client, each storage device of the first set as a backup destination for respective files of the plurality of files. The source client is further configured to transmit the first backup plan over the network to the server, wherein the server is configured to store the first backup plan in a database.

16 Claims, 2 Drawing Sheets

(56) References Cited

U.S. PATENT DOCUMENTS

2005/0171956 A1\* 8/2005 O'Brien et al. ............... 707/10
2008/0005380 A1   1/2008 Kawasaki et al.
2008/0133622 A1\* 6/2008 Brown et al. ............... 707/204

OTHER PUBLICATIONS

International Preliminary Report on Patentability for PCT/US2009/039353, dated Oct. 5, 2010, pp. 1-5.\*
"Avamar Axion for Remote Office Data Protection", Avamar Technologies, Inc., Sep. 2006, pp. 1-4.\*
"Web + Remote Backup Plan", FilesAnywhere [online May 21, 2006], http://backup.filesanywhere.com/FilesAnywherePortal_RemoteBackup.htm, pp. 1-2.\*
Scherring Chong, "Ahsay Offsite Backup Server v4.6 User's Guide", 2005, Lebshama Company Ltd, 123 pages.\*
Memeo, "Memeo AutoBackup User Guide", Document Version mab083106, 19 pages, captured by the Internet Archive Wayback Machine on Mar. 6, 2007 from Memeo.com.\*
Globenewswire.com, "Memeo Announces the Next Generation of Its Flagship AutoBackup Software", Oct. 10, 2006, 2 pages.\*

\* cited by examiner

ONLINE-ASSISTED BACKUP AND RESTORE

CROSS REFERENCE TO RELATED APPLICATIONS

This application claims priority from U.S. Provisional App. No. 61/042,197, filed Apr. 3, 2008, and entitled ONLINE ASSISTED BACKUP AND RESTORE, which is hereby incorporated by reference as if fully set forth herein.

BACKGROUND OF THE INVENTION

The use of backup and restoration strategies for electronic files, such as digital photographs, digital music files and digital documents stored on computer systems, is growing in use. In such strategies, an administrator of a computer system causes electronic files to be stored to various storage devices associated with, or otherwise accessible to, the computer system. Such storage devices may include online storage servers and removable storage media. More specifically, a strategy may involve the design by a user of a backup plan, which may be implemented as an electronic file including a set of user-specified preferences, wherein files may be stored to respective devices depending on particular characteristics of each file. For example, digital photographs may be backed up to an online server that offers a photo printing service, unusually large files may be backed up to a high-capacity online server, and digital music files may be backed up to a removable storage medium that may be directly coupled to the computer system.

In conventional approaches, when implementing a backup plan on a new computer, or when a user wish to alter a currently implemented backup plan, users must go through a lengthy process when creating or restoring a backup plan. For example, file structures must be recreated, which can be a very lengthy process. Additionally, backup strategies implemented by the backup plan must be recalled or recreated, which may be difficult or otherwise inconvenient for a user.

SUMMARY OF THE INVENTION

In an embodiment, a system includes a server and a source client executable on a first electronic device configured to be in communication over a network with the server. The first electronic device has stored thereon a plurality of electronic files. The first electronic device is in communication with at least one storage device of a plurality of storage devices. The source client is configured to generate a first electronic-file backup plan. The first backup plan characterizes a first set of the storage devices. The first backup plan further designates, according to input received from a user of the source client, each storage device of the first set as a backup destination for respective files of the plurality of files. The source client is further configured to transmit the first backup plan over the network to the server, wherein the server is configured to store the first backup plan in a database.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Embodiments of the invention may be described in the general context of computer-executable instructions, such as program modules, executed by one or more computer processors or other devices. Generally, program modules include routines, programs, objects, components, data structures, etc. that perform particular tasks or implement particular abstract data types. Typically the functionality of the program modules may be combined or distributed as desired in various embodiments.

Figure 1:
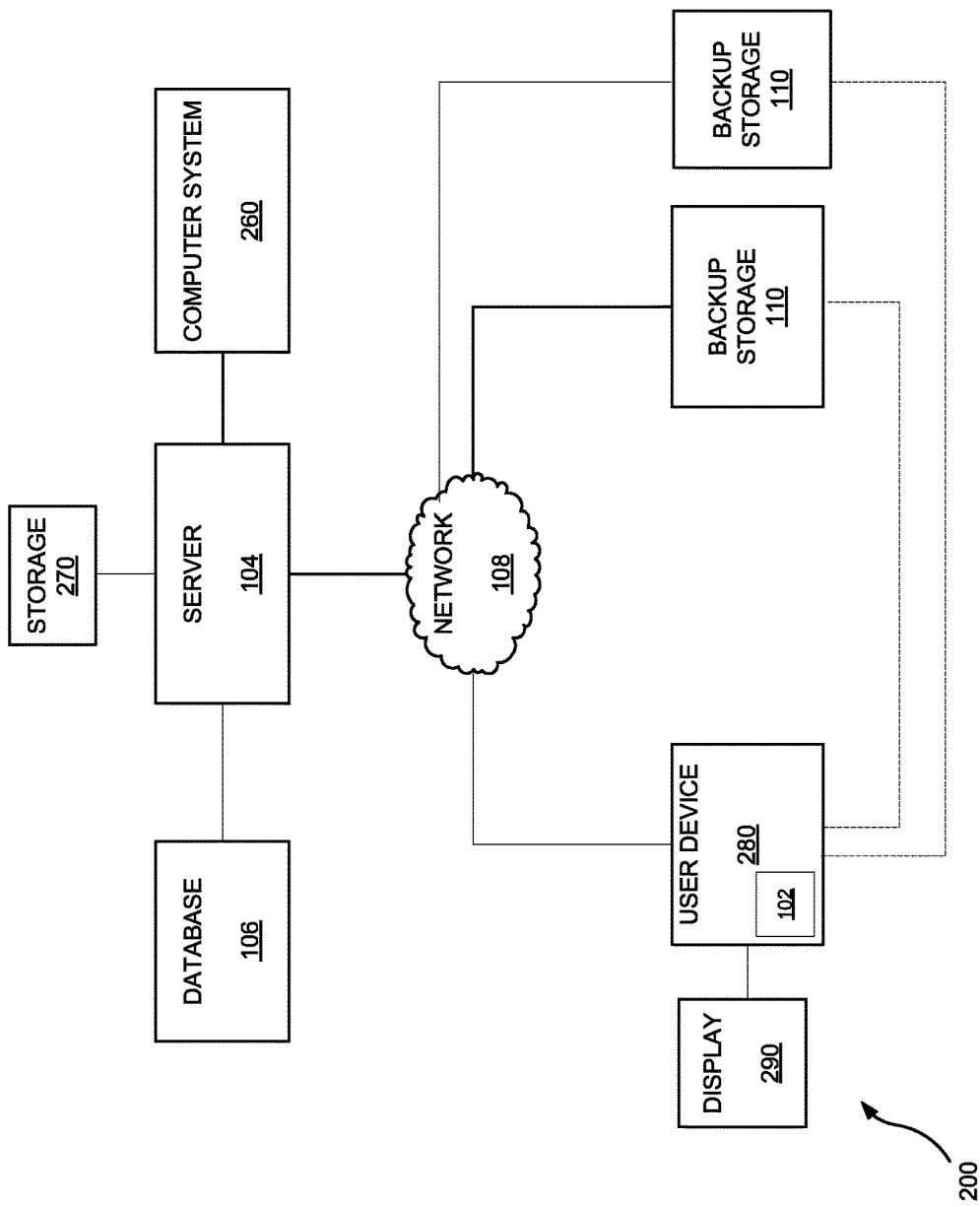
FIG. 1 illustrates a backup system according to an embodiment of the invention.

FIG. 1 illustrates a backup system 200 according to an embodiment of the invention. Elements of the system 200 illustrated in FIG. 1 may include or otherwise utilize at least some form of computer readable media, which may be associated with one or more processors and/or memory devices. Computer readable media can be any available media that can be accessed by one or more components of such operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by one or more components of such operating environment. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Referring now to FIG. 1, an embodiment of the present invention can be described in the context of an exemplary computer network system 200 as illustrated. System 200 includes an electronic user device 280, such as a personal computer, workstation or other processing device (e.g., personal digital assistants), that are linked via a communication medium, such as a network 108 (e.g., WiFi, LAN, Internet, WiMax, etc.), to an electronic device or system, such as a server 104. The server 104 may further be coupled, or otherwise have access, to a database 106, electronic storage 270 and a computer system 260. Although the embodiment illustrated in FIG. 1 includes one server 104 coupled to one user device 280 via the network 108, it should be recognized that embodiments of the invention may be implemented using two or more such user devices coupled to one or more such servers.

In an embodiment, user device 280 may include or may be otherwise coupled to a computer screen or display 290 and one or more backup storage devices 110 (e.g., online storage servers, removable storage media, etc.), directly or via the network 108. User device 280 can be used for various purposes including both network- and local-computing processes.

The user device 280 is linked via the network 108 to server 104 so that computer programs, such as, for example, a client application 102 running on the user device 280, can cooperate in two-way communication with server 104. The client application 102 can be transmitted to user device 280 over the network 108 from the server 104 or other device for subsequent installation on user device 280.

Server 104 may be coupled to database 106 and/or electronic storage 270 to retrieve information therefrom and to store information thereto. Additionally, the server 104 may be coupled to the computer system 260 in a manner allowing the server to delegate certain processing functions to the computer system.

The user device 280 has stored thereon a plurality of electronic files (e.g., digital photographs, digital music files, digital documents, etc.). In response to user input to the user device 280 reflecting a file-backup strategy desired by the user, the source client 102 is configured to generate an electronic-file backup plan (constituent elements of which are described in greater detail hereinafter) characterizing, for each specific file stored on the user device 280 and/or type of file stored on the user device 280, a respective backup storage device 110 on which such files are desired to be backed up. The source client 102 is further configured to transmit the backup plan over the network 108 to the server 104, as well as execute the backup plan with regard to the files stored on the user device 280. Subsequently, the server 104 may store the backup plan to, for example, the database 106.

In an embodiment and a similar manner, the user may cause to be generated and stored multiple different backup plans that can be subsequently implemented in one or more user devices 280. Additionally, if the user subsequently modifies a particular backup plan (by, for example, choosing a different backup location for a particular file), this modified backup plan may be "pushed" by the client 102 or "pulled" by the server 104 for storage in the database 106.

Figure 2:
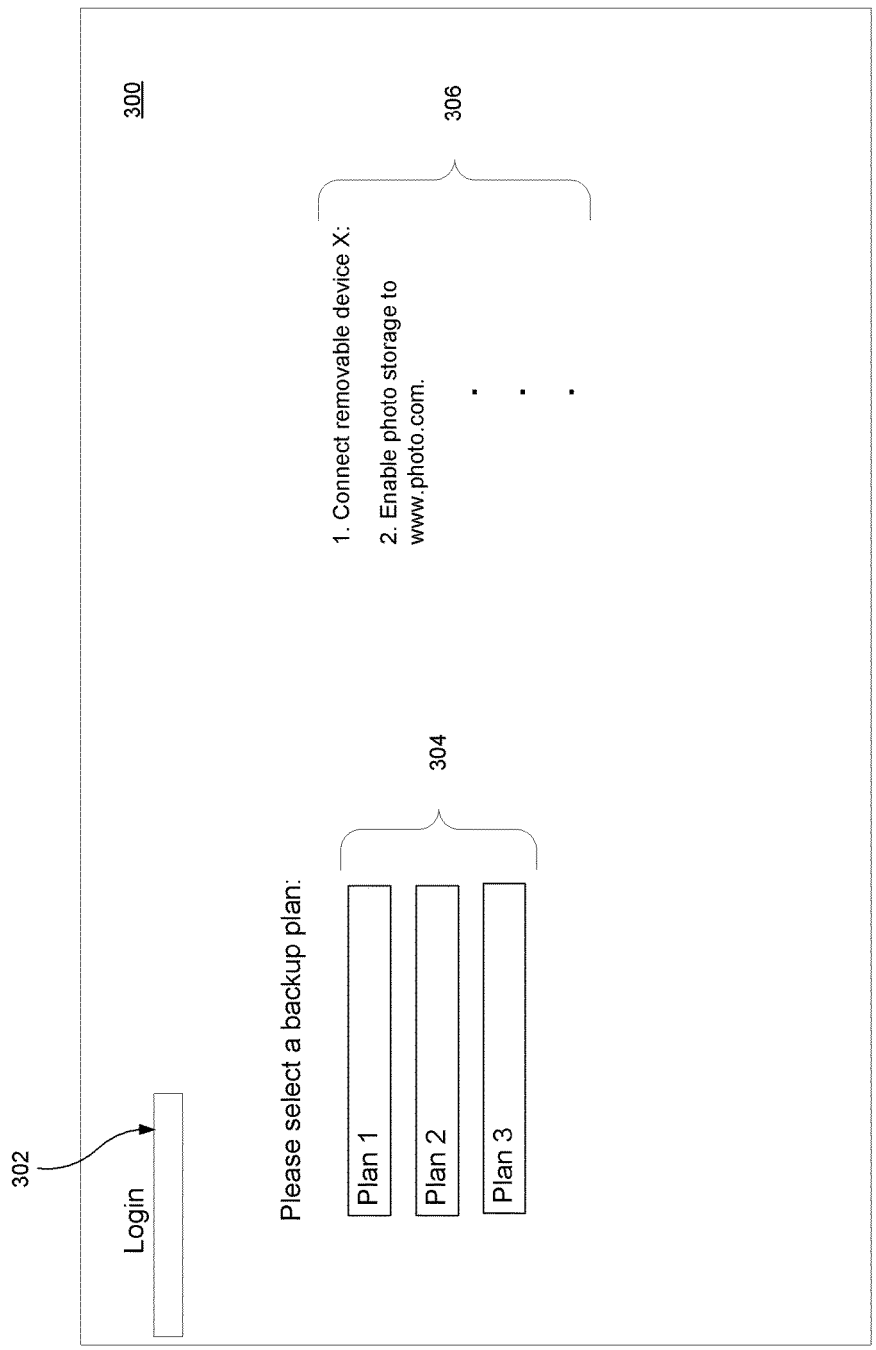
FIG. 2 illustrates a GUI according to an embodiment of the invention.

In an embodiment, and as a consequence of the storage of backup plans remotely from the user device 280, the system 200 offers to a user the ability to recreate or otherwise implement anew a stored backup plan in the user device 280 or other user device to which the server 104 is accessible. For example, and referring to FIG. 2, if the user purchases a new computer to replace an old computer on which a backup plan stored in database 106 has been implemented, the user may, using login text field 302 associated with a graphical user interface (GUI) 300 generated by client 102 and displayable on, for example, display device 290, provide login credentials to access one or more backup plans previously created by the user and stored by server 104 on database 106. After a successful login, the GUI 300 can present the user with a list 304 of previously created and user-selectable backup plans from which to choose a plan to implement with respect to files stored on the new computer. In an embodiment, the client 102, using, for example, an automatic-detection feature, may provide to the server 104 information describing the new computer, as well as storable devices accessible thereto. Consequently, the server 104 may function to suggest to the user a particular backup plan of the list 304 based on such information gathered by the client 102.

In response to a user selection of a backup plan from the list 304, the server 104 retrieves from the database 106 data associated with the selected backup plan, and transmits this data to the client 102. In an embodiment, the GUI 300 uses this data to generate an instruction list 306 operable to guide the user in enabling the selected backup scheme. For example, such a list 306 may sequentially guide the user in connecting external drives to the new computer and/or suggest optimal backup locations for particular file types.

Backup-plan data that may be generated by the client 102, stored on database 106, and subsequently provided to client 102 to implement the backup plan on a user device, such as user device 280, may include the following:

name of the backup plan/operation;
type of backup (e.g., local backups (backing up to internal hard drives), DAS (direct attached storage) backups, NAS (network attached storage) backups, online backup (via internet), p2p (peer to peer location) backups, ftp backups, webDAV backups);
destination of files to be backed up (e.g., URL, external drive address, other backup media address, etc.);
history of backup activities;
user account information (e.g., username, first name, last name, etc.);
listing of files backed up (e.g., filenames, types, dates, types, sizes, other file attributes, etc.)
backup scheduling information (i.e., how frequently to back up files);
frequency of past backups;
selection of files or category of files to back up (e.g., Office Document Files (Work, Excel, PowerPoint, Access)—doc, dot, xls, ppt, Financial Files (QuickBook, Quicken, MS Money, Tax)—qdf, qel, mny, tax, qbw, Photos and Pictures Files—jpg, jpeg, bmp, gif, png, raw, tif, tiff, Music Files—mp3, mp4, m4a, m4p, wav, wma, Video Files—wmv, mov, mpg, avi, and Outlook Files—pst, ost);
locations of files to be backed up;
number of file versions to keep;
encryption key for encryption of backed-up files;
rules/filters pertaining to files to be backed up.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system, comprising:
   a server;
   a plurality of backup storage devices;
   a source client executable on a first electronic device configured to be in communication with the server and the backup storage devices, the first electronic device having stored thereon a plurality of electronic files and plurality of file backup plans including a first electronic-file backup plan, the source client configured to generate the first electronic-file backup plan by designating each backup storage device of the plurality of backup storage devices as a backup destination for respective files of the plurality of files, the source client further configured to transmit the first electronic-file backup plan to the server for storage in a database of the server, wherein the first electronic device executes the first electronic-file backup plan and the execution generates backup files of the respective files of the plurality of files on the first electronic device and transfers the backup files to respective ones of the plurality of backup storage devices designated in the backup plan;

wherein the source client is executable on a second electronic device to automatically detect and provide to the server device information describing the second electronic device and a set of the plurality of backup storage devices accessible by the second electronic device, wherein the server is configured to generate, based on the device information, a suggestion of a file backup plan of the plurality of file backup plans for use by the second electronic device.

2. The system of claim 1, wherein the source client is configured to:
modify the first backup plan in response to at least one user action; and
transmit the modified first backup plan to the server for storage in the database.

3. The system of claim 1, wherein the server is configured to:
receive an identification of the user from the source client; and
transmit at least one portion of the first backup plan to the source client in response to receiving the identification.

4. The system of claim 3, wherein the source client is configured to generate a graphical user interface (GUI) to a display device associated with the first electronic device, the GUI configured to identify to the user, based on the at least one portion of the first backup plan, a set of storage devices of the plurality that are to be coupled to the first electronic device to implement the first backup plan.

5. The system of claim 3, wherein the source client is configured to generate a graphical user interface (GUI) to a display device associated with the first electronic device, the GUI configured to identify to the user, based on the at least one portion of the first backup plan, a set of backup destinations for respective files of the plurality of files to implement the first backup plan.

6. The system of claim 1, wherein the source client is configured to generate a second electronic-file backup plan, the generating the second backup plan including defining one or more attributes of backup operations and associating the one or more attributes with the user of the source client, the one or more attributes including characterizing a second set of the storage devices and designating according to input received from the user of the source client each storage device of the second set as a backup destination for respective files of the plurality of files, the source client further configured to transmit the second backup plan over the network to the server, wherein the server is configured to store the second backup plan in a database.

7. The system of claim 6, wherein the server is configured to:
receive an identification of the user from the source client;
receive from the user a selection of one of the first and second backup plans; and
transmit, in response to receiving the user selection, at least one portion of the selected backup plan to the source client.

8. The system of claim 6, wherein the source client is configured to generate a graphical user interface (GUI) to a display device associated with the first electronic device, the GUI configured to recommend to the user, based on an identification of the plurality of storage devices in communication with the first electronic device, one of the first and second backup plans to be implemented by the first electronic device.

9. A method comprising:
accessing, on at least one first computer, computer-executable instructions that, when executed enable the at least one first computer to perform:
generating a first electronic-file backup plan, by designating each backup storage device of a plurality of backup storage devices as a backup destination for respective files of the plurality of files, wherein the first computer executes the first electronic-file backup plan and the execution generates backup files of the respective files of the plurality of files on the first computer and transfers the backup files to the plurality of backup storage devices designated in the backup plan;
transmitting the first electronic-file backup plan to a server for storage in a database of the server; and
accessing, on at least one second computer, the computer-executable instructions that, when executed enable the at least one second computer to automatically detect and provide to the server device information describing the at least one second computer and a set of the plurality of backup storage devices accessible by the at least one second computer, wherein the server is configured to generate, based on the device information, a suggestion of a file backup plan of the plurality of file backup plans for use by the at least one second computer.

10. The method of claim 9, wherein the instructions further enable the processing system to:
modify the first backup plan in response to at least one user action; and
transmit the modified first backup plan to the server for storage in the database.

11. The method of claim 9, wherein the instructions further enable the processing system to:
provide to the server an identification of the user; and
receive from the server at least one portion of the first backup plan in response to providing the identification.

12. The method of claim 11, wherein the instructions further enable the processing system to generate a graphical user interface (GUI) to a display device associated with the processing system, the GUI configured to identify to the user, based on the at least one portion of the first backup plan, a set of storage devices of the plurality that are to be coupled to the processing system to implement the first backup plan.

13. The method of claim 11, wherein the instructions further enable the processing system to generate a graphical user interface (GUI) to a display device associated with the processing system, the GUI configured to identify to the user, based on the at least one portion of the first backup plan, a set of backup destinations for respective files of the plurality of files to implement the first backup plan.

14. The method of claim 9, wherein the instructions further enable the processing system to generate a second electronic-file backup plan, the generating the second backup plan including defining one or more attributes of backup operations and associating the one or more attributes with the user of the processing system, the one or more attributes including characterizing a second set of the storage devices and designating according to input received from the user of the processing system each storage device of the second set as a backup destination for respective files of the plurality of files, the instructions further enabling the processing system to transmit the second backup plan over the network to the server to enable storage of the second backup plan in the database.

15. The method of claim 14, wherein the instructions further enable the processing system to:
   provide to the server an identification of the user;
   provide to the server a user selection of one of the first and second backup plans; and
   receive from the server, in response to providing the user selection, at least one portion of the selected backup plan.

16. The method of claim 14, wherein the instructions further enable the processing system to generate a graphical user interface (GUI) to a display device associated with the processing system, the GUI configured to recommend to the user, based on an identification of the plurality of storage devices in communication with the processing system, one of the first and second backup plans to be implemented by the processing system.

* * * * *